US010652419B2

(12) United States Patent
Okumura

(10) Patent No.: US 10,652,419 B2
(45) Date of Patent: May 12, 2020

(54) INFORMATION PROCESSOR AND NON-TRANSITORY STORAGE MEDIUM STORING INSTRUCTIONS READABLE BY THE INFORMATION PROCESSOR

(71) Applicant: BROTHER KOGYO KABUSHIKI KAISHA, Nagoya-shi, Aichi-ken (JP)

(72) Inventor: Fumio Okumura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/232,470

(22) Filed: Dec. 26, 2018

(65) Prior Publication Data
US 2019/0132467 A1 May 2, 2019

Related U.S. Application Data

(63) Continuation of application No. 15/435,379, filed on Feb. 17, 2017, now Pat. No. 10,200,557.

(30) Foreign Application Priority Data

Mar. 30, 2016 (JP) .................................. 2016-069430

(51) Int. Cl.
*H04N 1/00* (2006.01)
*H04N 1/32* (2006.01)
(Continued)

(52) U.S. Cl.
CPC ....... *H04N 1/00949* (2013.01); *H04N 1/0022* (2013.01); *H04N 1/00307* (2013.01);
(Continued)

(58) Field of Classification Search
CPC ............. H04N 1/00949; H04N 1/3255; H04N 1/32776; H04N 1/32539; H04N 1/32529;
(Continued)

(56) References Cited

U.S. PATENT DOCUMENTS

| 9,369,995 B2 * | 6/2016 | Chakrabarti ............ H04W 4/70 |
| 2012/0239830 A1 | 9/2012 | Sugimura et al. |

FOREIGN PATENT DOCUMENTS

| JP | H09-198211 A | 7/1997 |
| JP | 2012-213144 A | 11/2012 |

(Continued)

OTHER PUBLICATIONS

United States Notice of Allowance dated Sep. 25, 2018 received in related U.S. Appl. No. 15/435,379.
(Continued)

*Primary Examiner* — Tammy Paige Goddard
*Assistant Examiner* — Darryl V Dottin
(74) *Attorney, Agent, or Firm* — Scully, Scott, Murphy & Presser, PC

(57) ABSTRACT

A non-transitory storage medium stores instructions which cause an information processor to execute: a first determination processing for determining whether at least one of a first condition, a second condition, and a third condition is established; a first communication processing for receiving input data obtained from an input device and transmitting the input data to an output device, when at least one of the first condition, the second condition, and the third condition is established; and a second communication processing for transmitting instruction information to the input device when none of at least one condition determined in the first determination processing among the first condition, the second condition, and the third condition is established. The instruction information is for instructing the input device to transmit the input data to the output device.

22 Claims, 5 Drawing Sheets

(51) Int. Cl.
*H04N 1/327* (2006.01)
*H04L 29/08* (2006.01)

(52) U.S. Cl.
CPC ..... *H04N 1/00315* (2013.01); *H04N 1/00954* (2013.01); *H04N 1/3255* (2013.01); *H04N 1/32529* (2013.01); *H04N 1/32539* (2013.01); *H04N 1/32776* (2013.01); *H04L 67/12* (2013.01); *H04N 2201/0039* (2013.01); *H04N 2201/0043* (2013.01); *H04N 2201/0055* (2013.01); *H04N 2201/0065* (2013.01); *H04N 2201/0094* (2013.01); *H04N 2201/33342* (2013.01)

(58) Field of Classification Search
CPC ............. H04N 1/00954; H04N 1/0022; H04N 1/00315; H04N 1/00307; H04N 2201/0055; H04N 2201/0043; H04N 2201/0039; H04N 2201/0094; H04N 2201/0065; H04N 2201/33342; H04L 67/12
USPC ........................................................ 358/1.15
See application file for complete search history.

(56) References Cited

FOREIGN PATENT DOCUMENTS

| | | |
|---|---|---|
| JP | 2014-146382 A | 8/2014 |
| JP | 2015-060374 A | 3/2015 |
| JP | 2015-195037 A | 11/2015 |

OTHER PUBLICATIONS

United States Official Action dated Apr. 19, 2018 received in related U.S. Appl. No. 15/435,379.

Japanese Office Action dated Sep. 24, 2019 in Japanese Patent Application No. 2016-069430.

\* cited by examiner

INFORMATION PROCESSOR AND NON-TRANSITORY STORAGE MEDIUM STORING INSTRUCTIONS READABLE BY THE INFORMATION PROCESSOR

CROSS REFERENCE TO RELATED APPLICATION

This application is a continuation application of U.S. application Ser. No. 15/435,379 filed on Feb. 17, 2017, which claims priority from Japanese Patent Application No. 2016-069430, which was filed on Mar. 30, 2016, the disclosure of which is herein incorporated by reference in its entirety.

BACKGROUND

Technical Field

The following disclosure relates to an information processor capable of communicating with a plurality of devices and to a non-transitory storage medium storing a plurality of instructions readable by a computer of the information processor.

Description of the Related Art

There is known a technique for causing an image forming apparatus to execute a work flow in which operations to be performed are defined in advance.

SUMMARY

One example of the technique is execution of the work flow by a combination of a plurality of devices connected to a network such as a scanner and a printer. The devices sequentially execute processings for one data according to the work flow. A communication path needs to be appropriately determined for appropriate execution of data processing. Inappropriate communication path may cause problems such as failure of the data processing and a long processing time. An aspect of the disclosure relates to a technique for execution of data processing using an appropriate communication path.

In one aspect of the disclosure, a non-transitory storage medium stores a plurality of instructions readable by a computer of an information processor including a communication interface capable of communicating with a plurality of devices. The plurality of instructions cause the computer to execute: a first selection accepting processing in which the computer accepts selection of an input processing from among a plurality of processings executable by an input device selected from among the plurality of devices, the input processing being a processing in which data is input; a second selection accepting processing in which the computer accepts selection of an output processing from among a plurality of processings executable by an output device selected from among the plurality of devices, the output processing being a processing in which data is output; a first determination processing in which the computer determines whether at least one of a first condition, a second condition, and a third condition is established, wherein the first condition is established when the selected input processing and the selected output processing correspond to each other, the second condition is established when a manner of execution of the selected output processing is a particular manner, and the third condition is established when the selected output device is in a particular state; a first communication processing in which when the computer in the first determination processing determines that at least one of the first condition, the second condition, and the third condition is established, the computer receives input data obtained by execution of the selected input processing, from the input device via the communication interface and transmits the received input data to the output device via the communication interface; and a second communication processing in which when the computer determines that none of at least one condition determined in the first determination processing among the first condition, the second condition, and the third condition is established, the computer transmits instruction information to the input device via the communication interface, the instruction information being information for instructing the input device to transmit the input data to the output device.

In another aspect of the disclosure, an information processor includes: a communication interface capable of communicating with a plurality of devices; and a controller configured to control the information processor to execute: a first selection accepting processing in which the controller accepts selection of an input processing from among a plurality of processings executable by an input device selected from among the plurality of devices, the input processing being a processing in which data is input; a second selection accepting processing in which the controller accepts selection of an output processing from among a plurality of processings executable by an output device selected from among the plurality of devices, the output processing being a processing in which data is output; a first determination processing in which the controller determines whether at least one of a first condition, a second condition, and a third condition is established, wherein the first condition is established when the selected input processing and the selected output processing correspond to each other, the second condition is established when a manner of execution of the selected output processing is a particular manner, and the third condition is established when the selected output device is in a particular state; a first communication processing in which when the controller in the first determination processing determines that at least one of the first condition, the second condition, and the third condition is established, the controller receives input data obtained by execution of the selected input processing, from the input device via the communication interface and transmits the received input data to the output device via the communication interface; and a second communication processing in which when the controller determines that none of at least one condition determined in the first determination processing among the first condition, the second condition, and the third condition is established, the controller transmits instruction information to the input device via the communication interface, the instruction information being information for instructing the input device to transmit the input data to the output device.

The processings described above may be implemented by a method of controlling the information processor.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Configuration of Network 10

Figure 1:
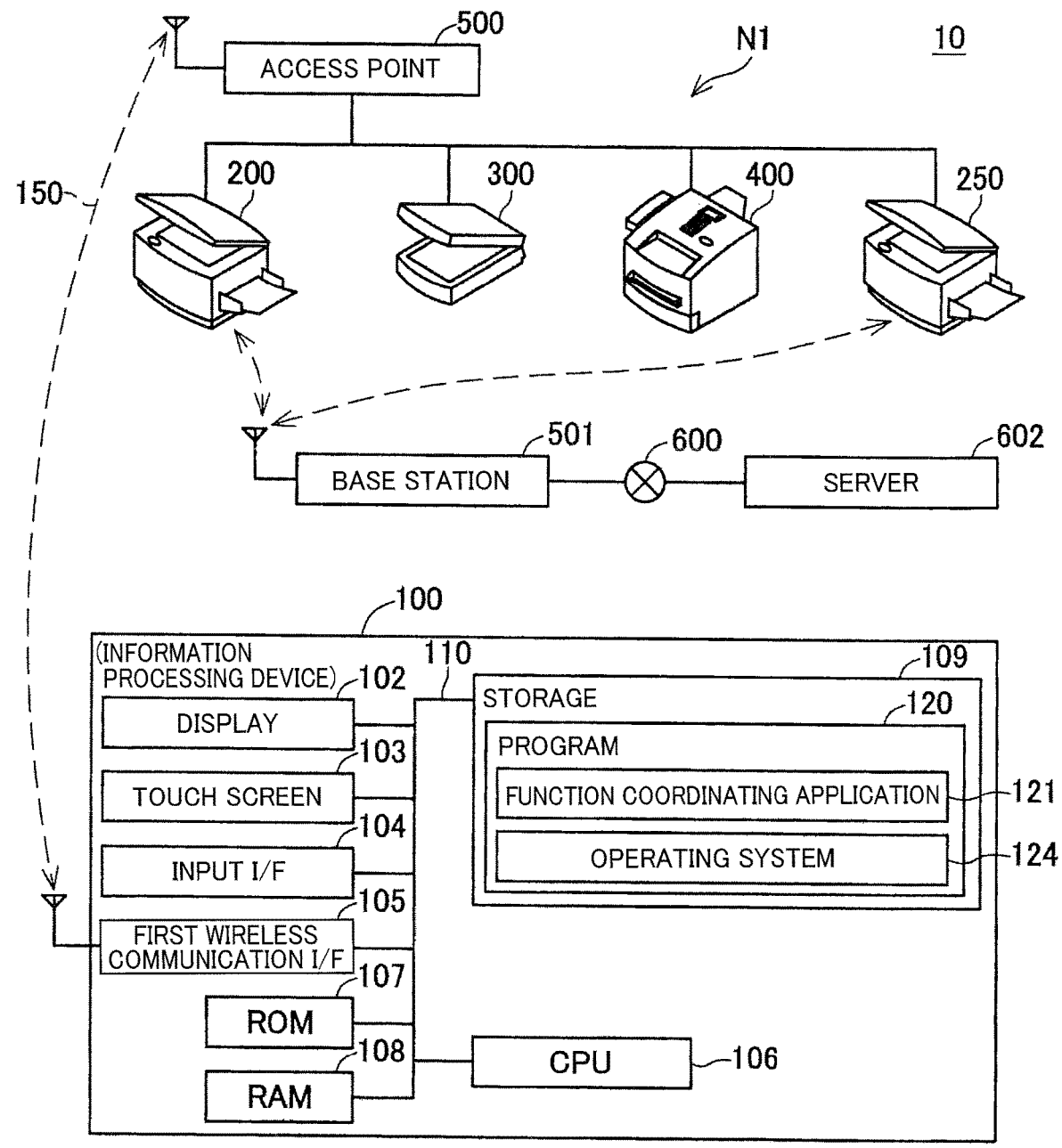
FIG. 1 is a block diagram illustrating a configuration of a network.

FIG. 1 illustrates a configuration of a network 10. The network 10 includes an information processor 100, ink-jet multi-function peripherals (MFPs) 200, 250, a scanner 300, a color laser printer 400, an access point 500, a base station 501, the Internet 600, and a server 602. The MFP has various functions including a printing function, a scanning function, and a facsimile function.

The information processor 100 carries out wireless communication 150 with a network N1 via a first wireless communication interface 105 and the access point 500. The ink-jet MFPs 200, 250, the scanner 300, and the color laser printer 400 are connected to the network N1. The ink-jet MFPs 200, 250 communicate with the server 602 over the Internet 600 via the base station 501. The server 602 is a storage server storing image data and is also an upload server to which image data is to be uploaded.

Configuration of Information Processor 100

The information processor 100 may be a mobile device such as a mobile phone and a mobile terminal. The information processor 100 includes a display 102, a touch screen 103, an input interface 104, the first wireless communication interface 105, a CPU 106, a ROM 107, a RAM 108, and a storage 109 which are connected to each other via an input/output port 110.

The display 102 receives an image signal output from the CPU 106 and displays an image based on the received image signal. The display 102 may be a liquid crystal display (LCD) or an organic EL display panel, for example. The touch screen 103 is transparent and superposed on the display 102 so as to cover its surface. The touch screen 103 detects a position touched by a user with his or her finger and outputs information about the detected position to the CPU 106. The input interface 104 includes operation buttons such as a power button. Pressing the input interface 104 initiates the information processor 100.

The CPU 106 executes programs stored in the storage 109. The RAM 108 temporarily stores information which is required for the CPU 106 to execute processings. The storage 109 is constituted by combination of devices including a flash memory, a hard disk (HDD), and a buffer included in the CPU 106. The storage 109 stores a program 120. The program 120 includes a function coordinating application 121 and an operating system 124. The CPU 106 executes processings according to the program 120. Hereinafter, the function coordinating application 121 will be referred simply as "application 121".

The application 121 combines and coordinates an input function and an output function to execute data processings. The input function and the output function are provided by a plurality of devices (apparatuses) communicably connected to the information processor 100. Examples of the plurality of devices include the ink-jet MFPs 200, 250, the scanner 300, and the color laser printer 400.

The input function is a function for obtaining input image data. Examples of the input function include the scanning function and a data download function. The scanning function is for scanning a document to create input image data. The ink-jet MFPs 200, 250 and the scanner 300 have the scanning function, for example. The data download function is a function for downloading image data stored in the server 602, via the Internet 600. The ink-jet MFPs 200, 250 have the data download function, for example.

The output function is a function for executing an output processing using the input image data received from an input device or the information processor 100. Examples of the output function include the printing function, the facsimile function, a mail function, and a data upload function. The printing function is a function for executing a print processing using the input image data. The ink-jet MFPs 200, 250 and the color laser printer 400 have the printing function, for example. The facsimile function is a function for performing facsimile transmission using the input image data over a public network, not illustrated. The ink-jet MFPs 200, 250 include the facsimile function, for example. The mail function is a function for transmitting a mail attached with the input image data over the Internet 600. The data upload function is a function for uploading the input image data to the server 602 over the Internet 600. The ink-jet MFPs 200, 250 have the facsimile function, the mail function, and the data upload function, for example.

In the following explanation, the CPU 106 which executes programs such as the application 121 and the operating system 124 may be described simply by the name of program. For example, wordings "the application 121 executes" may mean wordings "the CPU 106 executing the application 121 executes".

Operations of Application 121

There will be next explained processings executed by the CPU 106 according to the application 121 with reference to the flows in FIGS. 2-6. Upon initialization of the application 121, the sequence in FIG. 2 begins.

The application 121 establishes the wireless communication 150 with the access point 500 via the first wireless communication interface 105. The application 121 thereby establishes wireless communication with the input device at S200 and establishes wireless communication with the output device at S210. Though not illustrated, the application 121 establishes wireless connection to other devices. The input device performs the input function and is any of the devices 200-300. The output device performs the output function and is any of the devices 200, 250, 400.

The application 121 at S211 broadcasts device search signals via the first wireless communication interface 105 and receives information indicating each device on a wireless network, from each device via the first wireless communication interface 105.

The application 121 at S212 accepts selection of each of the input device and the output device among the plurality of devices on the wireless network. In this processing, for example, the application 121 may control the display 102 to display a list of button images representative of the respective devices and accept selection of each of the input device and the output device by touch of any of the button images. It is noted that the input device and the output device may be the same as each other.

The application 121 at S214 transmits a first inquiry signal to the input device via the first wireless communication interface 105 and at S215 receives first format information from the input device via the first wireless communication interface 105. The first format information indicates at least one format which can be processed by the input function.

The application 121 at S216 transmits a second inquiry signal to the output device via the first wireless communication interface 105 and at S217 receives second format information from the output device via the first wireless communication interface 105. The second format information indicates at least one format which can be processed by the output function. It is noted that the timing at which each of the first format information and the second format information is obtained at S214-217 is not limited to the timing described above and may be any timing as long as the timing is before the determination at S120.

The application 121 at S218 stores information indicating the input device, information indicating the output device, the first format information, and the second format information into the storage 109.

The application 121 at S220 monitors acceptance of input of a work-flow execution instruction. When the input of the work-flow execution instruction is accepted (S220: YES), this flow goes to S230. The application 121 at S230 executes a work-flow creating processing in FIG. 5.

Work-flow Creating Processing

Figure 5:
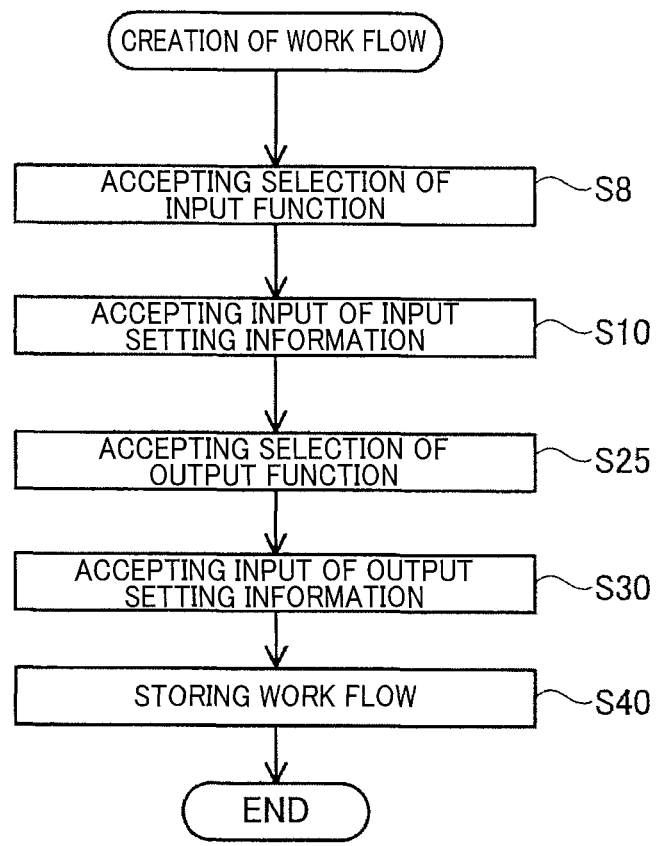
FIG. 5 is a flow chart illustrating a work-flow creating processing.

At S8 in FIG. 5, the application 121 accepts selection of an input function as a processing for inputting image data (i.e., scanning or download of data), from among processings which can be executed by the input device.

The application 121 at S10 accepts input of input setting information indicating an input setting of the input image data. In the case where the input function is the scanning function, the input setting contains a resolution, a color setting, a format of the input image data, and a reading sheet size, for example. The reading sheet size indicates a size of an area to be read by scanning. The format of the input image data may be a format selected by the user based on the received first format information, for example. Examples of the format of the input image data include a JPEG format, a TIFF format, and a PDF format. In the case where the input function is the data download function, the input setting contains an address of a server that stores data to be downloaded, for example.

The application 121 at S25 accepts selection of an output function as a processing for outputting image data (i.e., printing, facsimile, mail, and upload of data), from among processings which can be executed by the output device.

The application 121 at S30 accepts input of output setting information indicating an output setting of the input image data. In the case where the output function is the print processing, the output setting contains a color setting, an output sheet size, the number of printings, and a print quality such as dot density and use of glossy paper, for example. In the case where the output function is the facsimile processing, the output setting contains a destination of facsimile transmission, and a transmission image quality, for example. In the case where the output function is the mail processing, the output setting contains a destination of mail transmission, a format of attached file, and a time of transmission, for example. In the case where the output function is the upload processing, the output setting contains an address of an upload server, a name of a file to be uploaded, and a name of a folder to which the file is to be uploaded, for example.

The application 121 at S40 stores a work flow into the storage 109. The work flow is a file which contains information on processings executed by the input device and the output device and contains the information input at S218 in FIG. 2 and S8-S30. Upon completion of the processing at S40, the application 121 terminates the processing in FIG. 5.

Operations of Application 121 (Cont.)

Figure 2:
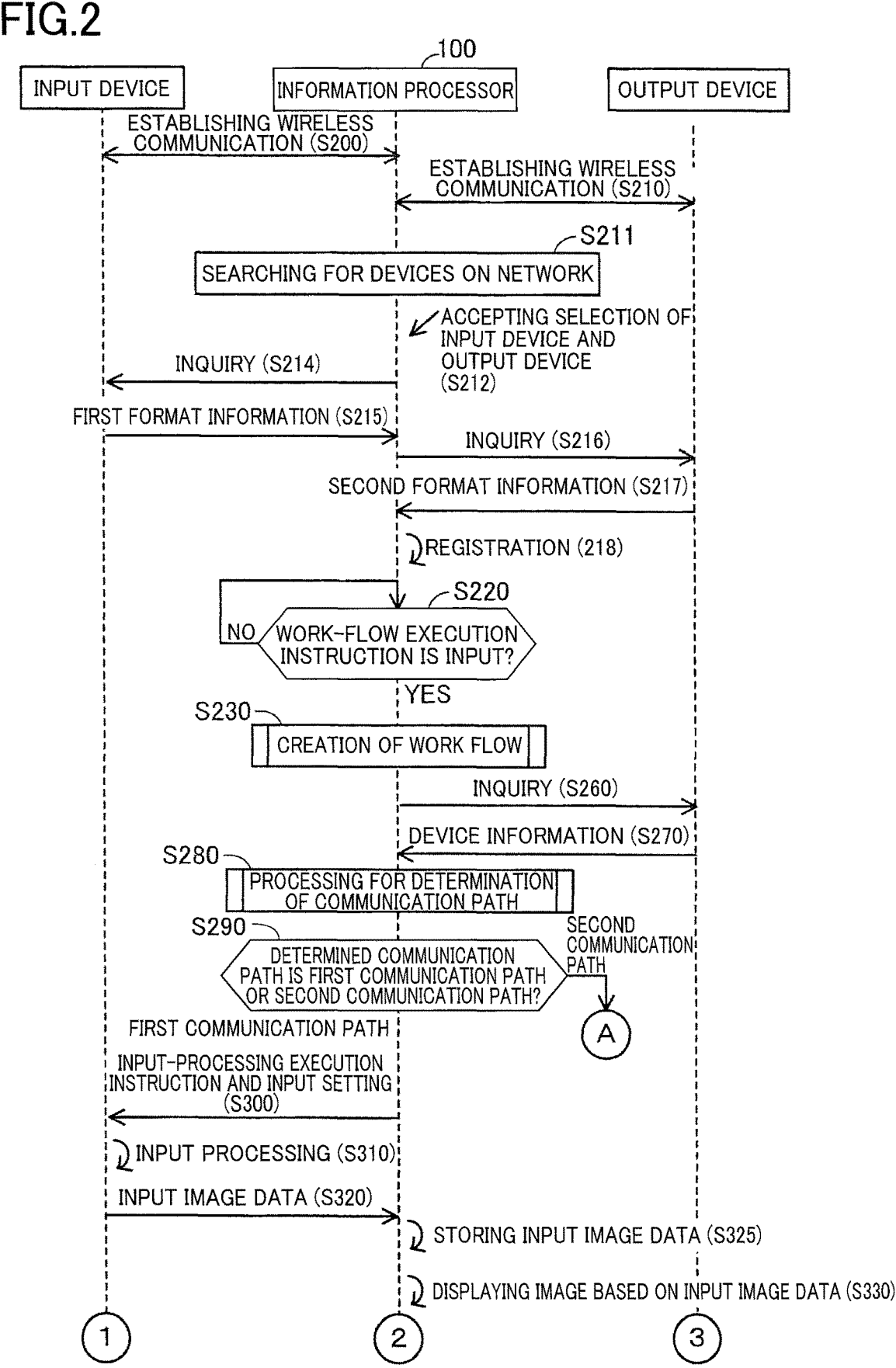
FIG. 2 is a sequence diagram illustrating processings to be executed by devices.

Returning to the flow in FIG. 2, the application 121 at S260 transmits a third inquiry signal to the output device via the first wireless communication interface 105. The application at S270 receives device information from the output device via the first wireless communication interface 105. The device information indicates a state of the output device. The device information contains: a radio signal strength of wireless communication with the output device; and error information indicating the presence or absence of error. In the case where the output function is the print processing, the device information further contains information indicating remaining amounts of consumables (i.e., ink and sheets) which are used in a printer of the output device. The application 121 at S280 executes a processing for determination of a communication path in FIG. 6.

Processing for Determination of Communication Path

Figure 6:
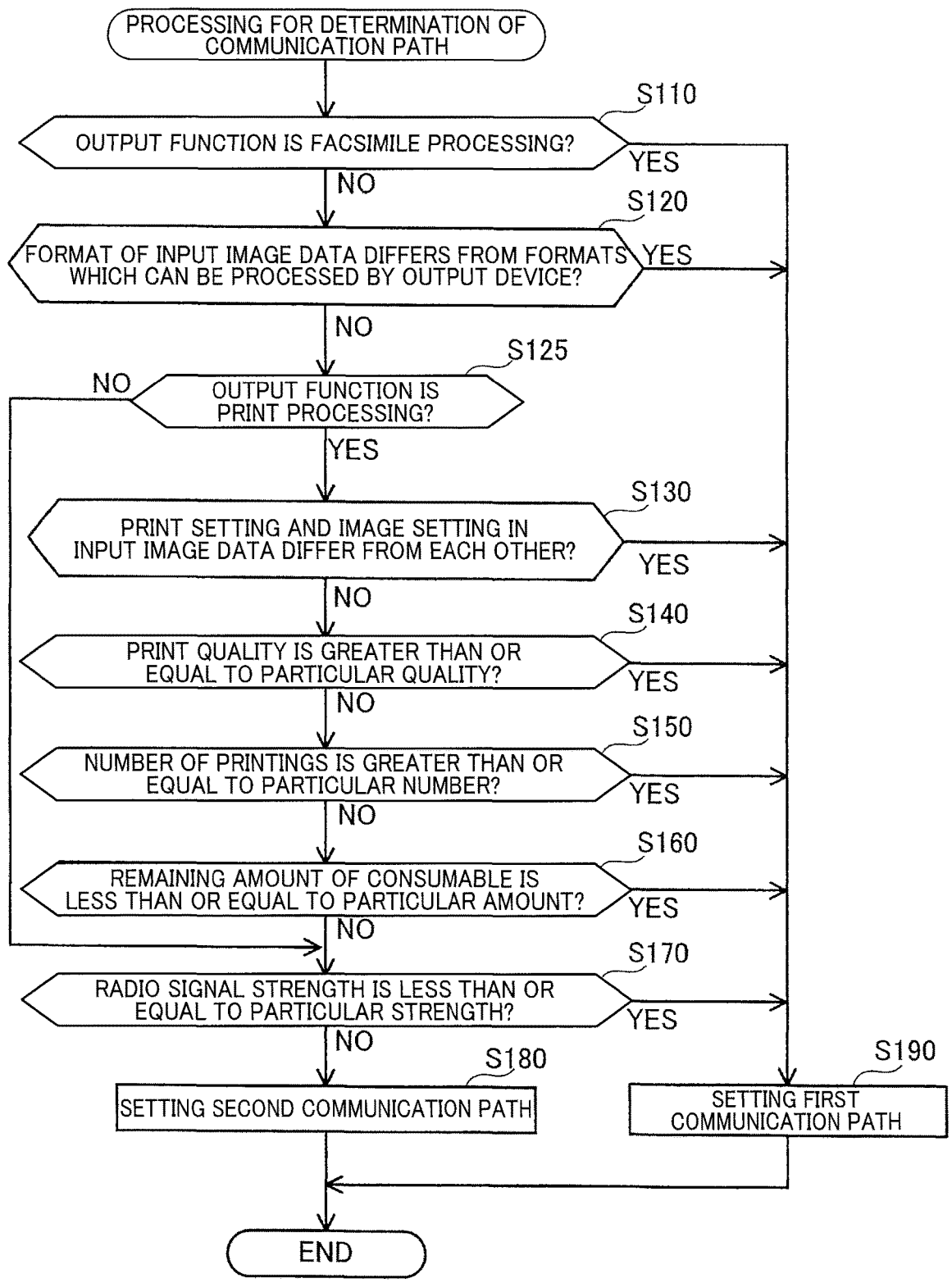
FIG. 6 is a flow chart illustrating a processing for determination of a communication path.

At S110 in FIG. 6, the application 121 determines whether the output function is the facsimile processing. When a positive decision is made at S110 (S110: YES), this flow goes to S190. When a negative decision is made at S110 (S110: NO), this flow goes to S120.

The application 121 at S120 determines whether the format of the input image data differs from formats which can be processed by the output device. Specifically, the application 121 determines whether the format input at S10 (i.e., the format indicated by the first format information) is contained in the at least one format indicated by the second format information. When a positive decision is made at S120 (S120: YES), this flow goes to S190. When a negative decision is made at S120 (S120: NO), this flow goes to S125.

The application 121 at S125 determines whether the output function is the print processing. When a positive decision is made at S125 (S125: YES), this flow goes to S130. When a negative decision is made at S125 (S125: NO), this flow goes to S170.

The application 121 at S130 determines whether an image setting and a print setting at least partly differ from each other. The image setting contains the color setting and the reading sheet size contained in the input setting. The print setting contains the color setting and the output sheet size contained in the output setting. Specifically, the application 121 determines whether the color setting of the image setting and the color setting of the print setting differ from each other and determines whether the reading sheet size contained in the image setting and the output sheet size contained in the print setting differ from each other. When a positive decision is made at S130 (S130: YES), this flow goes to S190. When a negative decision is made at S130 (S130: NO), this flow goes to S140.

The application 121 at S140 determines whether the print quality contained in the output setting is greater than or equal to a particular quality. Specifically, the application 121 may determine whether a dot density contained in the print quality is greater than or equal to a particular value and may determine whether an output sheet is a glossy sheet, for example. When a positive decision is made at S140 (S140: YES), this flow goes to S190. When a negative decision is made at S140 (S140: NO), this flow goes to S150.

The application 121 at S150 determines whether the number of printings which is contained in the output setting is greater than or equal to a particular number. When a positive decision is made at S150 (S150: YES), this flow goes to S190. When a negative decision is made at S150 (S150: NO), this flow goes to S160.

The application 121 at S160 determines whether the remaining amount of the consumable which is indicated by the device information is less than or equal to a particular amount. When a positive decision is made at S160 (S160: YES), this flow goes to S190. When a negative decision is made at S160 (S160: NO), this flow goes to S170.

The application 121 at S170 determines whether the radio signal strength indicated by the device information is less than or equal to a particular strength. When a positive decision is made at S170 (S170: YES), this flow goes to S190. When a negative decision is made at S170 (S170: NO), this flow goes to S180.

The application 121 at S180 sets a second communication path as a communication path for the input image data. The second communication path is a path through which the input image data is transmitted from the input device to the output device not via the information processor 100. Upon completion of the processing at S180, the application 121 terminates the processing in FIG. 6.

The application 121 at S190 sets a first communication path as a communication path for the input image data. The first communication path is a path through which the input image data is transmitted from the input device to the output device via the information processor 100. Upon completion of the processing at S190, the application 121 terminates the processing in FIG. 6.

Operations of Application 121 (Cont.)

Returning to the flow in FIG. 2, the application 121 at S290 determines whether the determined communication path is the first communication path or the second communication path. When the determined communication path is the first communication path (S290: FIRST COMMUNICATION PATH), this flow goes to S300. When the determined communication path is the second communication path (S290: SECOND COMMUNICATION PATH), this flow goes to S550 in FIG. 4.

The application 121 at S300 transmits an input-processing execution instruction and the input setting to the input device via the first wireless communication interface 105. The input-processing execution instruction is for instructing the input device to execute (i) an input processing for obtaining the input image data and (ii) a processing for transmitting the input image data to the information processor 100.

The input device at S310 executes the input processing according to the input-processing execution instruction and the input setting to obtain the input image data. Specifically, examples of the input processing include scanning and download of data.

The application 121 at S320 receives the input image data from the input device via the first wireless communication interface 105, at S325 stores the input image data into the storage 109, and at S330 controls the display 102 to display an image based on the input image data.

Figure 3:
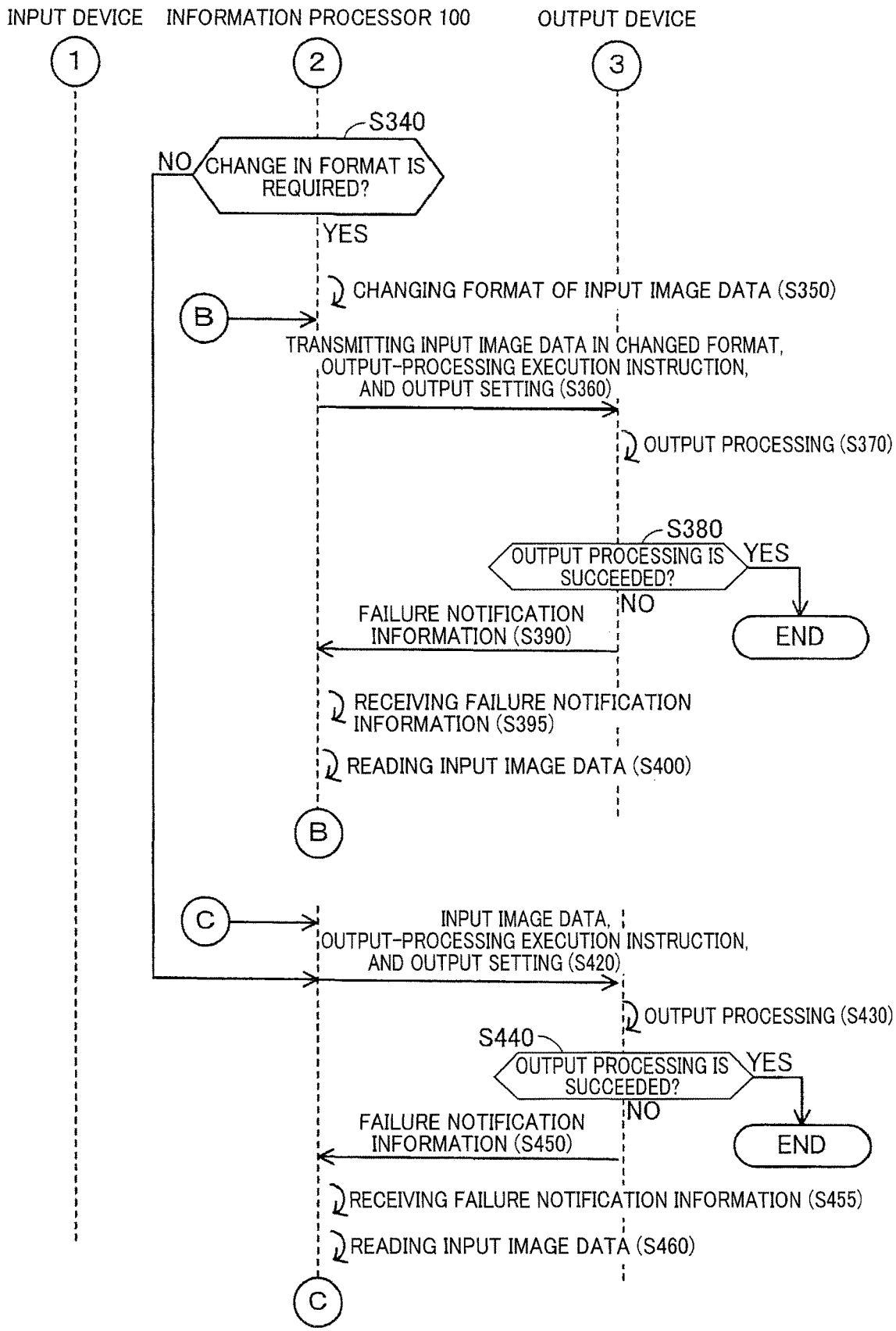
FIG. 3 is a sequence diagram continued from FIG. 2.

At S340 in FIG. 3, the application 121 determines whether the format of the input image data needs to be changed. Specifically, the application 121 executes the determination similar to that at S120 in FIG. 6. When a positive decision is made at S340 (S340: YES), this flow goes to S350. When a negative decision is made at S340 (S340: NO), this flow goes to S420.

The application 121 at S350 changes the format of the input image data to any of the at least one format indicated by the second format information. Specifically, the application 121 changes the input image data in the JPEG format to print data in the PDF format, for example. The application 121 at S360 transmits the input image data in the changed format, an output-processing execution instruction, and the output setting to the output device via the first wireless communication interface 105. The output-processing execution instruction is for instructing the output device to execute the output processing for outputting the input image data.

The output device at S370 executes the output processing to output the input image data. Specifically, examples of the output processing include printing, facsimile, mail, and upload of data.

The output device at S380 determines whether the output processing is succeeded. When a positive decision is made at S380 (S380: YES), this flow ends. When a negative decision is made at S380 (S380: NO), this flow goes to S390.

The application 121 at S390 receives failure notification information from the output device via the first wireless communication interface 105. The failure notification information indicates that the output processing cannot be executed normally. The application 121 at S395 determines that the failure notification information has been received from the output device.

Upon receiving the failure notification information, the application 121 at S400 reads the input image data stored in the storage 109 and repeats the processings at S350 and S360.

The application 121 at S420 transmits the input image data in the format not changed, the output-processing execution instruction, and the output setting to the output device via the first wireless communication interface 105. Processings at S430-S460 are similar to those at S370-S400, respectively. After the processing at S460, the processing at S420 is repeated.

Figure 4:
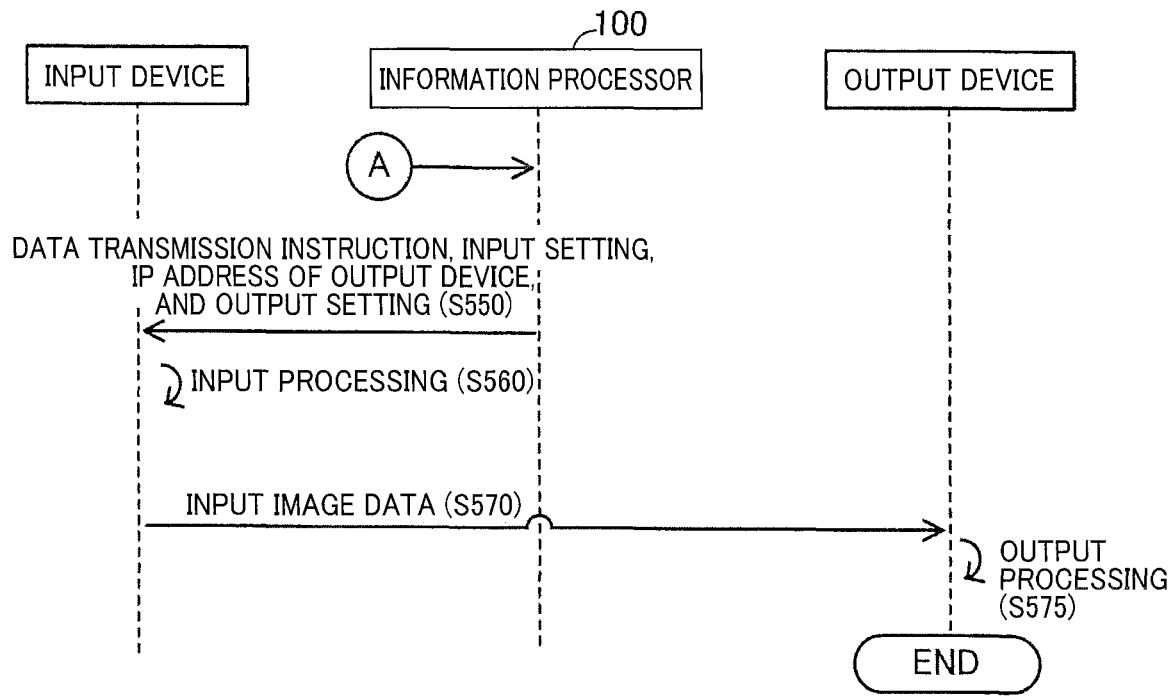
FIG. 4 is a sequence diagram continued from FIG. 2.

At S550 in FIG. 4, the application 121 transmits a data transmission instruction, the input setting, an IP address of the output device, and the output setting to the input device via the first wireless communication interface 105. A processing at S560 is similar to that at S310 in FIG. 2. The data transmission instruction is for instructing the input device to execute the input processing for obtaining the input image data and a processing for transmitting the input image data, the output setting, and the output-processing execution instruction to the output device.

The input device at S570 transmits the input image data in the format not changed, the output setting, and the output-processing execution instruction to the output device indicated by the IP address, according to the data transmission instruction. A processing at S575 is similar to the processing at S370 in FIG. 3.

Effects

In the present embodiment, the information processor 100 sets one of the first communication path including the information processor 100 and the second communication path not including the information processor 100 (S180, S190), in accordance with the processing to be executed for the input data (S110, S120, and S130-S160 in FIG. 6) and the state of the output device (S170). This processing enables the information processor 100 to execute the data processing with the appropriate communication path.

In the case where the remaining amount of the consumable is small (S160: YES) or in the case where it is difficult for the information processor 100 to communicate with the output device (S170: YES), there is a high possibility of failure of the output processing. In this case, the information processor 100 sets the first communication path through which the input image data is transmitted from the input device to the output device via the information processor 100. As a result, the information processor 100 obtains the input image data. Thus, even if the output processing has failed (S380: NO in FIG. 3, for example), the information processor 100 can easily input the input image data to the output device again (S360 after the loop, for example).

In the case where the output device cannot interpret the file format of the input image data (S120: YES in FIG. 6), the information processor 100 at S190 sets the first communication path through which the input image data is transmitted from the input device to the output device via the information processor 100. This processing enables the information processor 100 to receive the input image data (S320 in FIG. 2) and change the format of the input image data to a format which can be interpreted by the output device (S350 in FIG. 3, for example).

In the case where the print quality is high (S140: YES in FIG. 6) or in the case where the number of printings is large (S150: YES), the print error especially highly needs to be avoided. In this case, the information processor 100 at S190 sets the first communication path through which the input image data is transmitted from the input device to the output device via the information processor 100. As a result, the information processor 100 receives the input image data, allowing the user to check the image before its output. Thus, the print error can be avoided.

In the case where the output function is the facsimile processing (S110: YES), there is a high possibility that it is difficult for the user to check an image or characters having been output. In this case, the information processor 100 at S190 sets the first communication path through which the input image data is transmitted from the input device to the output device via the information processor 100. As a result, the information processor 100 receives the input image data, allowing the user to check the image before its output.

In the case where the image setting in an input and the print setting in an output at least partly differ from each other (S130: YES), the input image data may be output in a manner not intended by the user. In this case, the information processor 100 at S190 sets the first communication path through which the input image data is transmitted from the input device to the output device via the information processor 100. As a result, the information processor 100 receives the input image data, allowing the user to check the image before its output.

The information processor 100 at S330 displays the image before its output, allowing the user to check the image before its output.

The information processor 100 stores the input image data (S325 in FIG. 2). Thus, even if the output processing has failed (S380: NO in FIG. 3, for example), the information processor 100 can easily input the input image data to the output device again (S360 after the loop, for example).

While the embodiment has been described above, it is to be understood that the disclosure is not limited to the details of the illustrated embodiment, but may be embodied with various changes and modifications, which may occur to those skilled in the art, without departing from the spirit and scope of the disclosure.

Modifications

The information processor 100 may create the work flow in FIG. 5 before the input of the work-flow execution instruction at S220 in FIG. 2 and read the created work flow at S230 in FIG. 2.

In the event of failure of the output processing, the information processor 100 receives the failure notification information from the output device at S390 in FIG. 3. Instead of this processing, in the case where the output processing is succeeded, the output device may send the information processor 100 success notification information indicating that the output processing is finished successfully. In this case, the information processor 100 may determine whether the output processing is succeeded, based on whether the success notification information is received. That is, the information processor 100 may determine whether the output processing is succeeded, based on whether the information processor 100 receives the success notification information from the output device within a particular length of time from transmission of, e.g., the input image data to the output device at S360 or S420. Furthermore, the information processor 100 may transmit the input image data and other data to the output device again at S360 or S420 when the success notification information is not received within the particular length of time.

The devices 200, 250, 300, 400 are one example of the plurality of devices. The CPU 106 is one example of a computer. The application 121 is one example of a program. Each of the scanning and the data download is one example of a processing executable by the input device. The input function is one example of the input processing. The processing at S8 is one example of a first selection accepting processing. Each of the printing, the facsimile, the mail, and the upload of data is one example of a processing executable by the output device. The output function is one example of the output processing. The processing at S25 is one example of a second selection accepting processing. The processing at S280 is one example of a first determination processing. Each of the positive decisions (YES) at S120 and S130 is one example of a first condition. Each of the positive decisions (YES) at S110, S140, and S150 is one example of a second condition. Each of the positive decisions (YES) at S160 and S170 is one example of a third condition. Each of the processings at S320, S360, and S420 is one example of a first communication processing. The processing at S550 is one example of a second communication processing. The processing at S270 is one example of a first receiving processing. Each of the ink and the sheet is one example of the consumable. The processing at S215 is one example of a second receiving processing. The processing at S217 is one example of a third receiving processing. The processing at S120 is one example of a second determination processing. The processing at S350 is one example of a change processing. The processing at S30 is one example of each of a first input accepting processing and a number-of-printings accepting processing. Each of the color setting and the reading sheet size is one example of the image setting. The processing at S10 is one example of a second input accepting processing. Each of the color setting and the output sheet size is one example of the print setting. The processing at S330 is one example of a display processing. The processing at S325 is one example of a storing processing. Each of the processings at S395 and S455 is one example of a third determination processing. Each of the processings at S360 and S420 after the loop is one example of a third communication processing.

What is claimed is:

1. A non-transitory storage medium storing a plurality of instructions readable by a processor of an information processing device including a communication interface capable of communicating with a plurality of devices, the plurality of instructions, when executed by the processor, causing the information processing device to execute:

accepting a first selection of an input processing from among a plurality of processings executable by an input device selected from among the plurality of devices, the input processing being a processing in which data is input;

accepting a second selection of an output processing from among a plurality of processings executable by an output device selected from among the plurality of devices, the output processing including one of a print processing and a facsimile processing;

determining whether a particular condition is established by at least one of the selected input processing and the selected output processing;

when it is determined that the particular condition is established by the at least one of the selected input processing and the selected output processing, receiving input data obtained by execution of the selected input processing, from the input device via the communication interface and transmitting the received input data to the output device via the communication interface for execution of the selected output processing by the output device; and when it is determined that the particular condition is not established by the at least one of the selected input processing and the selected output processing, transmitting instruction information to the input device via the communication interface, the instruction information being information for instructing the input device to transmit the input data to the output device.

2. The non-transitory storage medium according to claim 1,
wherein, when the selected input processing and the selected output processing correspond to each other, it is determined that the particular condition is established by the selected input processing and the selected output processing.

3. The non-transitory storage medium according to claim 1,
wherein, when a manner of execution of the selected output processing is a particular manner, it is determined that the particular condition is established by the selected output processing.

4. The non-transitory storage medium according to claim 1,
wherein the plurality of instructions, when executed by the processor, cause the information processing device to further execute receiving device information from the output device via the communication interface, and the device information indicates a state of the output device, and
wherein the information processing device is configured to determine whether the particular condition is established, based on the received device information.

5. The non-transitory storage medium according to claim 4,
wherein the information processing device is configured to receive from the output device the device information indicating a remaining amount of a consumable used by a printer of the output device, when the selected output processing is a print processing, and
wherein the information processing device is configured to determine that the particular condition is established, when the remaining amount of the consumable which is indicated by the received device information is less than or equal to the particular amount.

6. The non-transitory storage medium according to claim 4,
wherein the information processing device is configured to receive the device information indicating a radio signal strength of wireless communication, when the communication interface is performing the wireless communication with the output device, and
wherein the information processing device is configured to determine that the particular condition is established, when the radio signal strength indicated by the received device information is less than or equal to a particular value.

7. The non-transitory storage medium according to claim 1,
wherein the plurality of instructions, when executed by the processor, cause the information processing device to further execute:
receiving first format information from the input device via the communication interface, the first format information indicating a format of the input data;
receiving second format information from the output device via the communication interface, the second format information indicating at least one format processable by the selected one of the print processing and the facsimile processing; and
determining whether the format indicated by the received first format information is contained in the at least one format indicated by the received second format information,
wherein the information processing device is configured to determine that the particular condition is established, when the information processing device determines that the format indicated by the first format information is not contained in the at least one format indicated by the second format information,
wherein the plurality of instructions, when executed by the processor, cause the information processing device to change the format of the received input data to any of the at least one format indicated by the second format information when it is determined that the particular condition is established, and
wherein the information processing device is configured to transmit the input data whose format has been changed to the output device.

8. The non-transitory storage medium according to claim 1,
wherein the plurality of instructions, when executed by the processor, cause the information processing device to accept input of first print setting information indicating a print quality in the print processing when the selected output processing is the print processing, and
wherein the information processing device is configured to determine that the particular condition is established, when the print quality indicating the first print setting information is greater than or equal to a particular quality.

9. The non-transitory storage medium according to claim 1,
wherein the plurality of instructions, executed by the processor, cause the information processing device to accept input of number-of-printings information indicating the number of printings in the print processing when the selected output processing is the print processing, and
wherein the information processing device is configured to determine that the particular condition is established, when the number of printings which is indicated by the number-of-printings information is greater than or equal to a particular number.

10. The non-transitory storage medium according to claim 1, wherein the information processing device is configured to determine that the particular condition is established, when the selected output processing is the facsimile processing.

11. The non-transitory storage medium according to claim 1,
- wherein the plurality of instructions, when executed by the processor, cause the information processing device to further execute:
  - accepting input of image setting information indicating an image setting for the input data, when the input data received from the input device is image data; and
  - accepting input of third print setting information indicating a print setting for the output processing, when the selected output processing is the print processing, and
- wherein the information processing device is configured to determine that the particular condition is established, when the image setting indicated by the image setting information and the print setting indicated by the third print setting information differ from each other.

12. The non-transitory storage medium according to claim 1, wherein the plurality of instructions, executed by the processor, cause the information processing device to execute controlling a display of the information processing device to display an image indicated by the received input data.

13. The non-transitory storage medium according to claim 1, wherein the plurality of instructions, executed by the processor, cause the information processing device to further execute:
- storing the received input data into a storage of the information processing device;
- after transmitting the input data to the output device, determining at least one of whether the information processing device has received first notification information from the output device via the communication interface and whether the information processing device has received second notification information from the output device via the communication interface within a particular length of time from transmission of the input data to the output device, wherein the first notification information indicates that the output processing using the input data is inexecutable, and the second notification information indicates that the output processing based on the input data is completed; and
- transmitting the input data stored in the storage, to the output device via the communication interface when it is determined that the information processing device has received the first notification information or it is determined that the information processing device has not received the second notification information within the particular length of time.

14. An information processing device, comprising:
- a communication interface capable of communicating with a plurality of devices; and
- a controller configured to control the information processing device to execute:
  - accepting a first selection of an input processing from among a plurality of processings executable by an input device selected from among the plurality of devices, the input processing being a processing in which data is input;
  - accepting a second selection of an output processing from among a plurality of processings executable by an output device selected from among the plurality of devices, the output processing including one of a print processing and a facsimile processing;
  - determining whether a particular condition is established by at least one of the selected input processing and the selected output processing;
  - when it is determined that the particular condition is established by the at least one of the selected input processing and the selected output processing, receiving input data obtained by execution of the selected input processing, from the input device via the communication interface and transmitting the received input data to the output device via the communication interface for execution of the selected output processing by the output device; and
  - when it is determined that the particular condition is not established by the at least one of the selected input processing and the selected output processing, transmitting instruction information to the input device via the communication interface, the instruction information being information for instructing the input device to transmit the input data to the output device.

15. The information processing device according to claim 14,
- wherein the information processing device is configured to further execute receiving device information from the output device via the communication interface, and the device information indicates a state of the output device, and
- wherein the information processing device is configured to determine whether the particular condition is established, based on the received device information.

16. The information processing device according to claim 14,
- wherein the information processing device is configured to receive from the output device the device information indicating a remaining amount of a consumable used by a printer of the output device, when the selected output processing is the print processing, and
- wherein the information processing device is configured to determine that the particular condition is established, when the remaining amount of the consumable which is indicated by the received device information is less than or equal to a particular amount.

17. The information processing device according to claim 14,
- wherein the information processing device is configured to receive the device information indicating a radio signal strength of wireless communication, when the communication interface is performing the wireless communication with the output device, and
- wherein the information processing device is configured to determine that the particular condition is established, when the radio signal strength indicated by the received device information is less than or equal to a particular value.

18. The information processor according to claim 14,
- wherein the information processing device is configured to further execute:
  - receiving first format information from the input device via the communication interface, the first format information indicating a format of the input data;
  - receiving second format information from the output device via the communication interface, the second format information indicating at least one format processable by the selected one of the printing processing and the facsimile processing; and determining whether the format indicated by the received first format information is contained in the at least one format indicated by the received second format information, wherein the information processing device is configured to determine that the particular condition is established, when it is determined that the format indicated by the first format information is not contained in the at least one format indicated by the second format information, wherein the information processing device is configured to change the format of the received input data to any of the at least one format indicated by the second format information when it is determined that the particular condition is established, and wherein the information processing device is configured to transmit the input data whose format has been changed to the output device.

19. The information processor according to claim 14, wherein the information processing device is configured to further execute, when the selected output processing is the print processing, accepting input of first print setting information indicating a print quality in the print processing, and wherein the information processing device is configured to determine that the particular condition is established, when the print quality indicating the first print setting information is greater than or equal to a particular quality.

20. The information processor according to claim 14, wherein the information processing device is configured to further execute, when the selected output processing is the print processing, accepting input of number-of-printings information indicating the number of printings in the print processing, and wherein the information processing device is configured to determine that the particular condition is established, when the number of printings which is indicated by the number-of-printings information is greater than or equal to a particular number.

21. The information processor according to claim 14, wherein the information processing device is configured to determine that the particular condition is established, when the selected output processing is the facsimile processing.

22. The information processor according to claim 14, wherein the information processing device is configured to further execute:

accepting input of image setting information indicating an image setting for the input data, when the input data received from the input device is image data; and accepting input of third print setting information indicating a print setting for the output processing, when the selected output processing is the print processing, and wherein the information processing device is configured to determine that the particular condition is established, when the image setting indicated by the image setting information and the print setting indicated by the third print setting information differ from each other.

* * * * *